United States Patent [19]

Martin et al.

[11] 4,366,141

[45] Dec. 28, 1982

[54] TREATMENT OF COARSE PARTICLE SIZE ZINC SULFIDE TO IMPROVE VISUAL AND INFRARED TRANSMISSION ON HOT-PRESSED ARTICLES

[75] Inventors: Brice E. Martin; Alan R. Schwartz, both of Towanda, Pa.

[73] Assignee: GTE Products Corporation, Stamford, Conn.

[21] Appl. No.: 248,394

[22] Filed: Mar. 27, 1981

[51] Int. Cl.³ .................. C01B 17/00; G02B 5/22; B29D 11/00

[52] U.S. Cl. .................. 423/561 B; 501/43; 501/904; 264/1.1; 350/1.1; 252/584

[58] Field of Search .............. 501/904, 43, 94; 423/561 B; 264/1.1, 1.2; 350/1.1; 252/301.6 S, 584

[56] References Cited

U.S. PATENT DOCUMENTS

| | | | |
|---|---|---|---|
| 2,571,905 | 10/1951 | Longini | 252/301.6 S |
| 2,651,584 | 9/1953 | Longini et al. | 428/323 |
| 3,058,807 | 10/1962 | Holland | 423/561 B |
| 3,131,238 | 4/1964 | Carnall et al. | 423/561 B |
| 3,178,307 | 4/1965 | Carnall et al. | 264/1 |
| 3,459,667 | 8/1969 | Larach et al. | 252/301.6 S |
| 4,146,379 | 3/1979 | Copley et al. | 501/904 |

FOREIGN PATENT DOCUMENTS

| | | | |
|---|---|---|---|
| 500404 | 2/1939 | United Kingdom | 252/301.6 S |
| 2033419 | 5/1980 | United Kingdom | 252/301.6 S |
| 2039272 | 8/1980 | United Kingdom | 252/301.6 S |

OTHER PUBLICATIONS

Kroger, F. A., Sodium and Lithium as Activators of Fluoresecence in Zinc Sulfide, J. of the Optical Society of America, vol. 39, #8, Aug. 1949 pp. 670–672.

Primary Examiner—Gary P. Straub
Attorney, Agent, or Firm—Ivan L. Ericson

[57] ABSTRACT

Coarse particle size zinc sulfide is treated with a solution of alkali metal halide to make it adaptable for hot-pressing into shaped, polycrystalline windows which is more transparent in the visible to near visible and infrared spectral regions than untreated coarse particle size zinc sulfide.

11 Claims, 1 Drawing Figure

TREATMENT OF COARSE PARTICLE SIZE ZINC SULFIDE TO IMPROVE VISUAL AND INFRARED TRANSMISSION ON HOT-PRESSED ARTICLES

FIELD OF THE INVENTION

This invention relates to a process in which coarse particle size precipitated zinc sulfide is treated with a solution of a reagent to make it adaptable for hot-pressing into shaped, polycrystalline windows having improved transmittance in the visible to near visible and infrared spectral regions over untreated coarse particle size precipitated zinc sulfide.

BACKGROUND OF INVENTION

In the field of ceramics, it is generally known that fine particles are more reactive than coarse particles, owing to their high surface energy. It is also known that the sintering rate is roughly proportional to the inverse of the particle size. It is also well known that the strength of sintered materials is directly related to the final grain size and porosity which in turn are closely related to the particle size of the starting material. The behavior of precipitated zinc sulfide during hot pressing is in accord with these general observations. Fine particle size precipitated zinc sulfide can be hot-pressed into specimens which have very good visual and infrared transmittance.

Coarse particle size precipitated zinc sulfide, when hot-pressed showed little or no grain growth, was unacceptably opaque in the visible to near visible spectral regions and had infrared transmissions and densities well below theoretical values.

Zinc sulfide is normally hot-pressed at temperatures between 810° and 900° C. depending on the particle size of the material. Coarse particle size ZnS generally requires higher temperatures than fine particle size ZnS. At the higher temperatures there is generally an increase in the amount of hexagonal ZnS present in the predominantly cubic ZnS matrix which causes scattering of radiation and undesirable opacity in the visible to near visible regions.

U.S. Pat. No. 3,131,025 discloses a method for producing a visible and infrared transparent zinc sulfide article by hot-pressing a zinc sulfide powder having a particle size of 5 microns or less.

U.S. Pat. No. 3,131,026 discloses a method for the purification of zinc sulfide powder which is particularly adaptable for hot pressing to produce transparent zinc sulfide articles. Impurities such as free sulfur, sulfate ions, and organic matter are removed from zinc sulfide powder by first air oxidizing the powder followed by treating with $H_2S$ or $H_2$.

U.S. Pat. No. 3,131,238 discloses a method for producing a polycrystalline zinc sulfide article by hot-pressing zinc sulfide powder of high purity having a particle size of not more than 5 microns. The high purity and small crystals give good results whereas larger crystals and lower purity give unsatisfactory results.

U.S. Pat. No. 3,483,028 discloses semiconductor materials such as zinc sulfide including impurities of alkali metal salt of Rb, Cs et al in concentrations of 100 to 10,000 atomic parts per million which have luminescent and photoconductive properties.

U.S. Pat. No. 2,651,584 discloses an x-ray fluorescent screen of zinc sulfide containing 20% alkali metal salt selected from the group which consists of CsI, CsBr, RbI, CsCl, RbBr, RbCl, KI, NaI.

Heretofore, it has been difficult to obtain zinc sulfide articles having acceptable optical properties when coarse particle size zinc sulfide powder is used.

SUMMARY OF THE INVENTION

It is an object of the present invention to provide a coarse particle size, high purity zinc sulfide powder which can be used to produce a polycrystalline article transparent to visible, near visible and infrared spectral regions having a density in the range of from about 99% to about 100% of theoretical density.

It is another object of the present invention to provide a process which can be used to effectively produce the zinc sulfide powder which can be used to produce a polycrystalline article transparent to visible, near visible and infrared spectral regions having a density in the range of from about 99% to about 100% of theoretical density.

It is another object of the present invention to provide a polycrystalline article transparent to visible, near visible and infrared spectral regions hot pressed having a density in the range of from about 99% to about 100% of and including theoretical density from a coarse particle size, high purity zinc sulfide powder.

Other and further objectives of the present invention will become apparent from the following description.

In accordance with one aspect of the present invention, there is provided a method for treating a coarse particle size zinc sulfide powder thoroughly mixed with a solution of alkali metal halide and dried, or by adding a solution of alkali metal halide to the filter cake of the zinc sulfide precipitate.

Figure 1:
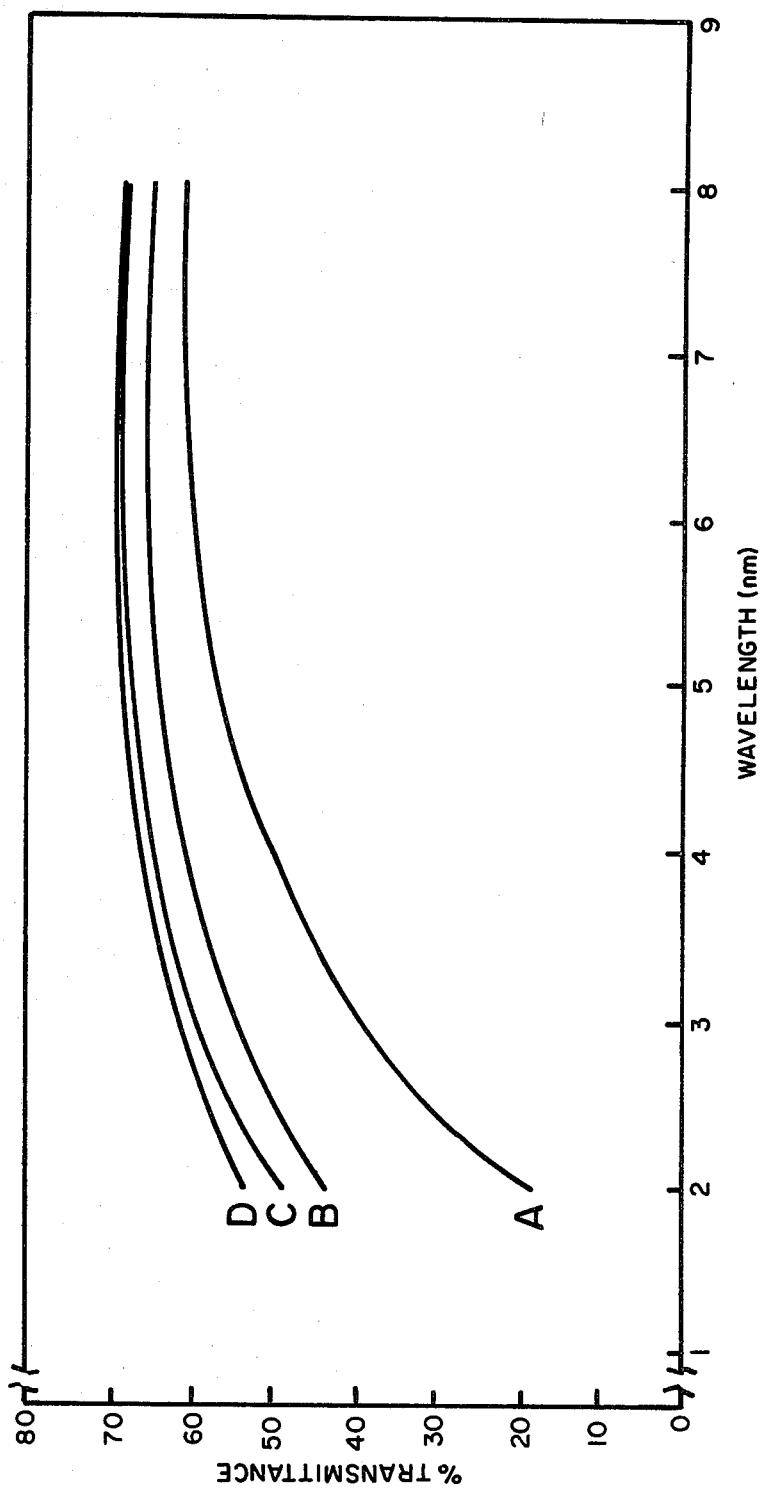
FIG. 1 is a graph showing the specular transmittance in the infrared region of transparent polycrystalline particles about 12 mm thick wherein Curve A is untreated ZnS powder with particle size range of from about 0.6 to about 9 microns, Curve B is 50 ppm CsCl added to Sample A powder, Curve C is 50 ppm CsCl added to ZnS powder and particle size range of from about 0.6 to about 11 microns and Curve D is untreated ZnS powder with a particle size range of from about 0.2 to about 7 microns.

For a better understanding of the present invention, together with other and further objects, advantages and capabilities thereof, reference is made to the following disclosure and appended claims in connection with the above described drawing.

DETAILED DESCRIPTION OF THE INVENTION

Specifically, this invention relates to a process in which coarse particle size, greater than about 5 microns, precipitated ZnS is thoroughly mixed with a solution which contains a known amount of an alkali metal halide and the resultant slurry is then dried. The coarse particle size precipitated ZnS is then adaptable for hot-pressing into windows which have improved transmission in the visible to near visible and infrared spectral regions over untreated coarse particle size precipitated ZnS which was hot-pressed under the same conditions.

The additive used in the present invention is an additive which upon melting is a stable liquid at the temperatures involved in hot-pressing zinc sulfide, does not contribute any undesirable absorption bands in the hot-pressed piece and aids in either better grain growth during hot-pressing or inhibits the formation of additional hexagonal ZnS during hot-pressing to yield a hot-pressed piece having improved visual and infrared transmission and having a density in the range of from about 99% to about 100% of theoretical density.

It is desirable in the practice of this invention that the additive compound has a melting point well below the hot-pressing temperature of the ZnS, that it has <10 mm Hg vapor pressure at the hot-pressing temperature of ZnS, and that it be added in minimal amounts greater than about 25 parts per million up to about 10,000 parts per million so as not to interfere with the infrared transmission or to cause pull-out of the ZnS grains during polishing or when exposed to weather. The preferred level of alkali metal halide addition is between about 50 parts per million to about 200 parts per million. The alkali metal halides have these especially preferred properties with the exception of the chlorides and fluorides of sodium and potassium, which melt above the especially preferred temperature. (See Table II). It was also desirable that the added compound would be a surface coating on the particles. The salts were chosen by having larger ionic radii than the $Zn^{+2}S^{-2}$ (Table III).

Example 1—50 ppm CsCl

A 31.2 ml volume of a master solution containing 2.55 g of CsCl per liter was diluted to 1 liter and mixed well with 1.56 kg of ZnS having particle sizes ranging from 0.6 micron up to 9 microns (Sample A and B, Table I). The slurry was then dried at 110° C., blended, and hot-pressed into a compact which when polished had a final thickness of approximately 12 mm. (See Curve B, FIG. 1).

An untreated sample of the same ZnS was hot-pressed under the same conditions with a final thickness of approximately 12 mm. (See Curve A, FIG. 1).

When 50 ppm CsCl was added to the same ZnS, the transmission at 2 microns was 2.5 times higher than the untreated ZnS. The transmission at 8 microns was approximately 5% higher for the CsCl treated ZnS.

Curve D of FIG. 1 is the transmission of an untreated ZnS article 12 mm thick hot pressed from a ZnS powder with a particle size range of 0.2 to 7 microns (Sample D, Table I).

Example 2—50 ppm CsCl

The technique was the same as in Example 1 except that the particle sizes of the powder ranged from 0.6 microns up to 11 microns (Sample C, Table I). The transmission of the resulting article at 12 mm thickness is shown in Curve C of FIG. 1.

TABLE I

Particle Size Distribution of ZnS Powder Measured by Sedigraph 5000

| Percent Less Than Size | Particle Size, Microns | | |
|---|---|---|---|
| | Sample A & B | Sample C | Sample D |
| 0 | 0.5 | 0.5 | 0.1 |
| 1 | 0.6 | 0.6 | 0.2 |
| 5 | 1.5 | 2.3 | 0.5 |
| 10 | 2.5 | 3.7 | 1.0 |
| 20 | 3.9 | 4.2 | 2.2 |
| 30 | 4.2 | 4.6 | 2.5 |
| 40 | 4.5 | 5.0 | 2.7 |
| 50 | 4.8 | 5.4 | 2.9 |
| 60 | 5.1 | 5.8 | 3.1 |
| 70 | 5.4 | 6.4 | 3.3 |
| 80 | 5.8 | 6.9 | 3.6 |
| 90 | 6.4 | 7.8 | 3.9 |
| 95 | 7.0 | 8.6 | 4.2 |
| 99 | 8.2 | 10.5 | 5.8 |
| 100 | 9.0 | 11.0 | 7.0 |

TABLE II*

| | Melting Pt. (°C.) | Boiling Pt. (°C.) | 10 mm Hg Vapor Pressure (°C.) |
|---|---|---|---|
| Group IA Halides Cubic | | | |
| LiBr | 547 | 1265 | 888 |
| LiCl | 613 | 1353 | 932 |
| LiF | 870 | 1676 | 1211 |
| LiI | 446 | 1190 | 841 |
| NaBr | 755 | 1390 | 952 |
| NaCl | 801 | 1413 | 1017 |
| NaF | 992 | 1704 | 1240 |
| NaI | 651 | 1304 | 903 |
| KBr | 730 | 1383 | 982 |
| KCl | 790 | 1407 | 968 |
| KF | 880 | 1502 | 1039 |
| KI | 723 | 1324 | 887 |
| RbBr | 682 | 1340 | 923 |
| RbCl | 715 | 1390 | 937 |
| RbF | 760 | 1410 | 1016 |
| RbI | 642 | 1300 | 884 |
| CsBr | 636 | 1300 | 887 |
| CsCl | 646 | 1290 | 884 |
| CsF | 684 | 1250 | 844 |
| CsI | 621 | 1280 | 873 |
| Group IVB | | | |
| PbCl₂ (monoclinic) | 501 | 950 | 648 |

*Handbook of Chemistry and Physics, Chemical Rubber Publishing Co., 43 Ed., p. 2372 to 2390, 1961-1962

TABLE III*

| Anion | Ionic Radii (Angstroms) | Cation | Ionic Radii (Angstroms) |
|---|---|---|---|
| $S^{-2}$ | 1.84 | $Zn^{+2}$ | 0.74 |
| $F^-$ | 1.36 | $Li^+$ | 0.60 |
| $Cl^-$ | 1.81 | $Na^+$ | 0.95 |
| $Br^-$ | 1.95 | $K^+$ | 1.33 |
| $I^-$ | 2.16 | $Rb^+$ | 1.48 |
| | | $Cs^+$ | 1.69 |

*Handbook of Chemistry and Physics, Chemical Rubber Publishing Co., 43 Ed., 3431, 1961-1962.

Example 3—50 ppm CsI

Using the same ZnS powder as in Example 1, the sample was treated with a solution of CsI to a level in the dried ZnS of 50 ppm CsI. On hot-pressing, this material was no better or no worse than with 50 ppm CsCl.

Example 4—50 ppm RbCl

Using the same ZnS powder as in Example 1, the sample was treated with a solution of RbCl to a level in the dried ZnS of 50 ppm RbCl. On hot-pressing this material was no better or no worse than with 50 ppm CsCl.

Example 5—50 ppm RbI

Using the same ZnS powder as in Example 1, the sample was treated with a solution of RbI to a level in the dried ZnS of 50 ppm RbI. On hot-pressing this material was no better or no worse than with 50 ppm CsCl.

Example 6—125 ppm CsCl

Using the same ZnS powder as in Example 1, the sample was treated with a solution of CsCl to a level in the dried ZnS of 125 ppm CsCl. On hot-pressing there was no significant difference than with 50 ppm CsCl.

Example 7—25 ppm CsCl

Using the same ZnS powder as in Example 1, the sample was treated with a solution of CsCl to a level in the dried ZnS of 25 ppm CsCl. The transmission at 2 microns and 8 microns was approximately the same as the untreated control sample.

Example 8—50 ppm $PbCl_2$

Using the same ZnS powder as in Example 2, the sample was treated with a solution of $PbCl_2$ to a level in the dried powder of approximately 50 ppm $PbCl_2$. The transmission was slightly lower than by using 50 ppm CsCl.

In addition to the above methods the solution of the salt can be added to the precipitated ZnS prior to filtration based on the knowledge of the amount of moisture normally retained by the filter cake or the solution of the salt can be added to the precipitated ZnS on the filter based on the knowledge of the volume of solution needed to replace the retained mother liquor or wash solution.

What is claimed is:

1. A coarse zinc sulfide powder comprising
   a coarse zinc sulfide powder having from about 5 to about 10 percent of particles greater than 7 microns, and
   about 25 to about 200 parts per million by weight of an alkali metal salt selected from the group consisting of RbBr, RbCl, RbI, CsBr, CsCl, CsI, and combinations thereof,
   said coarse zinc sulfide powder used for preparing a densified zinc sulfide article having a density in the range from about 99 to about 100 percent of theoretical density of zinc sulfide and having a visible, near visible, and infrared transmission greater than the visible, near visible, and infrared transmission of a densified zinc sulfide article prepared from said coarse zinc sulfide powder absent said alkali metal salt.

2. A method of preparing a densified zinc sulfide article comprising
   mixing a coarse zinc sulfide powder having from about 5 to about 10 percent of particles greater than 7 microns and from about 25 to about 200 parts per million by weight of an alkali metal salt selected from the group consisting of RbBr, RbCl, RbI, CsBr, CsCl, CsI, and combinations thereof to form a treated coarse zinc sulfide powder blended mixture,
   densifying said blended mixture by a combination of pressing and heating, said heating being done at a temperature above the melting point of said alkali metal salt and below the temperature of which the vapor pressure of said alkali metal salt is less than 10 millimeters of mercury, to form a densified zinc sulfide article having a density in the range from about 99 to about 100 percent of the theoretical density of zinc sulfide and having a visible, near visible, and infrared transmission greater than the visible, near visible, and infrared transmission of a densified zinc sulfide article prepared from said coarse zinc sulfide powder absent said alkali metal salt.

3. A method according to claim 2 wherein said densifying is done by hot pressing.

4. A method according to claim 2 wherein said mixing is done by adding alkali metal salt as a solution to said coarse zinc sulfide powder.

5. A method of preparing a densified zinc sulfide article comprising
   precipitating from a solution a precipitated coarse zinc sulfide having from about 5 to about 10 percent of particles greater than 7 microns,
   adding a sufficient amount of an alkali metal salt selected from the group consisting of RbBr, RbCl, RbI, CsBr, CsCl, CsI, and combinations thereof as a salt solution to provide from about 25 to about 200 parts per million of said alkali metal salt to said precipitated coarse zinc sulfide in the solution to form a treated precipitated coarse zinc sulfide,
   filtering said treated precipitated coarse zinc sulfide from the solution to form a filter cake,
   drying said filter cake to form a dried cake,
   blending said dried cake to form a blended mixture,
   densifying said blended mixture by a combination of pressing and heating, said heating being done at a temperature above the melting point of said alkali metal salt and below the temperature at which the vapor pressure of said alkali metal salt is less than 10 millimeters of mercury, to form a densified zinc sulfide article having a density in the range from about 99 to about 100 percent of the theoretical density of zinc sulfide and having a visible, near visible, and infrared transmission greater than the visible, near visible, and infrared transmission of a densified zinc sulfide article prepared from said coarse zinc sulfide powder absent said alkali metal salt.

6. A method according to claim 5 wherein said densifying is done by hot pressing.

7. A method of preparing a densified zinc sulfide article comprising
   precipitating from a solution a precipitated coarse zinc sulfide having from about 5 to about 10 percent of particles greater than 7 microns,
   filtering said precipitated coarse zinc sulfide from the solution to form a filter cake of said precipitated coarse zinc sulfide,
   adding a sufficient amount of an alkali metal salt selected from the group consisting of RbBr, RbCl, RbI, CsBr, CsCl, CsI, and combinations thereof as a salt solution to provide from about 25 to about 200 parts per million of said alkali metal salt to said filter cake of said precipitated coarse zinc sulfide,
   drying said filter cake to form a dried cake,
   blending said dried cake to form a blended mixture,
   densifying said blended mixture by a combination of pressing and heating, said heating being done at a temperature above the melting point of said alkali metal salt and below the temperature at which the vapor pressure of said alkali metal salt is less than 10 millimeters of mercury, to form a densified zinc sulfide article having a density in the range from about 99 to about 100 percent of the theoretical density of zinc sulfide and having a visible, near visible, and infrared transmission greater than the visible, near visible, and infrared transmission of a densified zinc sulfide article prepared from said coarse zinc sulfide powder absent said alkali metal salt.

8. A method according to claim 7 wherein said densifying is done by hot pressing.

9. A densified zinc sulfide article prepared by the method according to claim 2, 5 or 7.

10. A densified zinc sulfide article according to claim 9 wherein said densifying is done by hot pressing.

11. A densified zinc sulfide article prepared by the method according to claim 4.

* * * * *